(12) United States Patent
Ishikura et al.

(10) Patent No.: US 11,309,709 B2
(45) Date of Patent: Apr. 19, 2022

(54) HIGH-FREQUENCY CURRENT COMPENSATOR AND AIR-CONDITIONING SYSTEM

(71) Applicant: Mitsubishi Electric Corporation, Tokyo (JP)

(72) Inventors: Keisuke Ishikura, Tokyo (JP); Shinsaku Kusube, Tokyo (JP); Kazuyuki Mitsushima, Tokyo (JP); Keiichi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/056,642

(22) PCT Filed: Jul. 18, 2018

(86) PCT No.: PCT/JP2018/026901
§ 371 (c)(1),
(2) Date: Nov. 18, 2020

(87) PCT Pub. No.: WO2020/016960
PCT Pub. Date: Jan. 23, 2020

(65) Prior Publication Data
US 2021/0203161 A1    Jul. 1, 2021

(51) Int. Cl.
*H02J 3/01*      (2006.01)
*H02M 1/12*      (2006.01)
*F24F 11/88*     (2018.01)

(52) U.S. Cl.
CPC .............. *H02J 3/01* (2013.01); *F24F 11/88* (2018.01); *H02M 1/126* (2013.01); *H02J 2310/14* (2020.01)

(58) Field of Classification Search
CPC .......... H02J 3/01; H02J 2310/14; F24F 11/88; H02M 1/126
(Continued)

(56) References Cited

U.S. PATENT DOCUMENTS

2016/0226425 A1    8/2016  Kawashima
2019/0252881 A1*   8/2019  Kono ..................... H02M 7/48
2019/0312503 A1   10/2019  Kawashima

FOREIGN PATENT DOCUMENTS

JP          5212303 B      6/2013
JP       2014-147234 A     8/2014
(Continued)

OTHER PUBLICATIONS

International Search Report of the International Searching Authority dated Aug. 14, 2018 for the corresponding international application No. PCT/JP2018/026901 (and English translation).

*Primary Examiner* — Toan T Vu
*Assistant Examiner* — Dru Parries
(74) *Attorney, Agent, or Firm* — Posz Law Group, PLC

(57) ABSTRACT

A harmonic current compensating device according to an embodiment of the present disclosure is a harmonic current compensating device including a power converter including at least a pair of arms each including a switching element, the harmonic current compensating device being configured to drive the switching element and supply compensating current to load current flowing between a system power source and a harmonic generating load, in which the switching element includes a unipolar device using a wide bandgap semiconductor.

13 Claims, 3 Drawing Sheets

(58) Field of Classification Search
USPC .......................................................... 307/105
See application file for complete search history.

(56) References Cited

FOREIGN PATENT DOCUMENTS

| | | |
|---|---|---|
| JP | 5871832 B | 3/2016 |
| JP | 6112103 B | 4/2017 |
| JP | 6237852 B | 11/2017 |
| WO | 2015/045425 A1 | 4/2015 |
| WO | 2018/109805 A1 | 6/2018 |

* cited by examiner

HIGH-FREQUENCY CURRENT COMPENSATOR AND AIR-CONDITIONING SYSTEM

CROSS REFERENCE TO RELATED APPLICATION

This application is a U.S. national stage application of International Application No. PCT/JP2018/026901 filed on Jul. 18, 2018, the contents of which are incorporated herein by reference.

TECHNICAL FIELD

The present disclosure relates to a harmonic current compensating device and an air-conditioning system that suppress a harmonic component generated by a harmonic generating load.

BACKGROUND ART

Current supplied from an alternating-current power source and flowing through an electric circuit contains a harmonic component due to a power converting device such as an inverter device. When the current containing the harmonic component flows through the electric circuit, distortion in power source voltage due to the harmonic current sometimes gives an adverse effect such as undesired noise and heat generation, to other electric equipment. Hence, a harmonic current compensating device to compensate the harmonic current is provided.

In a conventional harmonic current compensating device, a system power source is connected to a harmonic generating load such as a power converting device, in parallel. The conventional harmonic current compensating device detects load current flowing through the harmonic generating load, and extracts, from the load current, the harmonic component generated by the harmonic generating load, under the assumption that the load current does not change rapidly and has a cyclic property. Then, the conventional harmonic current compensating device calculates a compensation amount from the harmonic component delayed by one power source cycle, and generates compensating current to offset the harmonic component by on-off control of a switching element base on the calculated compensation amount, so that the compensation is performed.

The conventional harmonic current compensating device detects the line voltage between two lines in a control cycle, and determines one cycle of a power source cycle at a zero point of the power source voltage. Further, the conventional harmonic current compensating device calculates an effective phase voltage based on the power source cycle obtained by the zero point determination and the detected line voltage, and calculates an instantaneous phase voltage based on the calculated effective phase voltage and a phase θ detected in the control cycle. By outputting the compensating current by the above method, the conventional harmonic current compensating device offsets the harmonic component, so that the harmonic component does not flow to the system power source beyond a harmonic component upper limit regulated by a harmonic guideline (see Patent Literature 1, for example).

Further, the conventional harmonic current compensating device decides the compensating current for each detected phase of the current of the system power source, using an error memory control in the current control, and thereby suppresses the harmonic current component to equal to or less than the harmonic component upper limit regulated by the harmonic guideline. At this time, there are a method in which an error memory number is changed based on the relation with a switching frequency while the switching frequency is fixed, a method in which the switching frequency is changed in the power source cycle while the error memory is fixed, and other methods.

CITATION LIST

Patent Literature

Patent Literature 1: Japanese Unexamined Patent Application Publication No. 2014-147234

SUMMARY OF INVENTION

Technical Problem

Meanwhile, in the power converting device or other devices as the harmonic generating load, to suppress the heat generation and other adverse effects, the device can be configured without the use of an electrolytic capacitor. When the device is configured without the use of the electrolytic capacitor, a rapid change in the harmonic component, for example, occurs in the harmonic generating load. Therefore, to efficiently suppress the harmonic, it is necessary to quickly control the switching element of the harmonic current compensating device.

The present disclosure has an object to provide a harmonic current compensating device and an air-conditioning system that can efficiently suppress the harmonic, to solve the above problem.

Solution to Problem

A harmonic current compensating device according to an embodiment of the present disclosure is a harmonic current compensating device including a power converter including at least a pair of arms each including a switching element, the harmonic current compensating device being configured to drive the switching element and supply compensating current to load current flowing between a system power source and a harmonic generating load, in which the switching element includes a unipolar device using a wide bandgap semiconductor.

Advantageous Effects of Invention

According to the harmonic current compensating device of an embodiment of the present disclosure, since the switching element includes the unipolar device using the wide bandgap semiconductor, it is possible to drive the power converter at a frequency higher than switching frequencies of other power converters. Therefore, it is possible to compensate even a higher harmonic than before.

DESCRIPTION OF EMBODIMENTS

Figure 1:
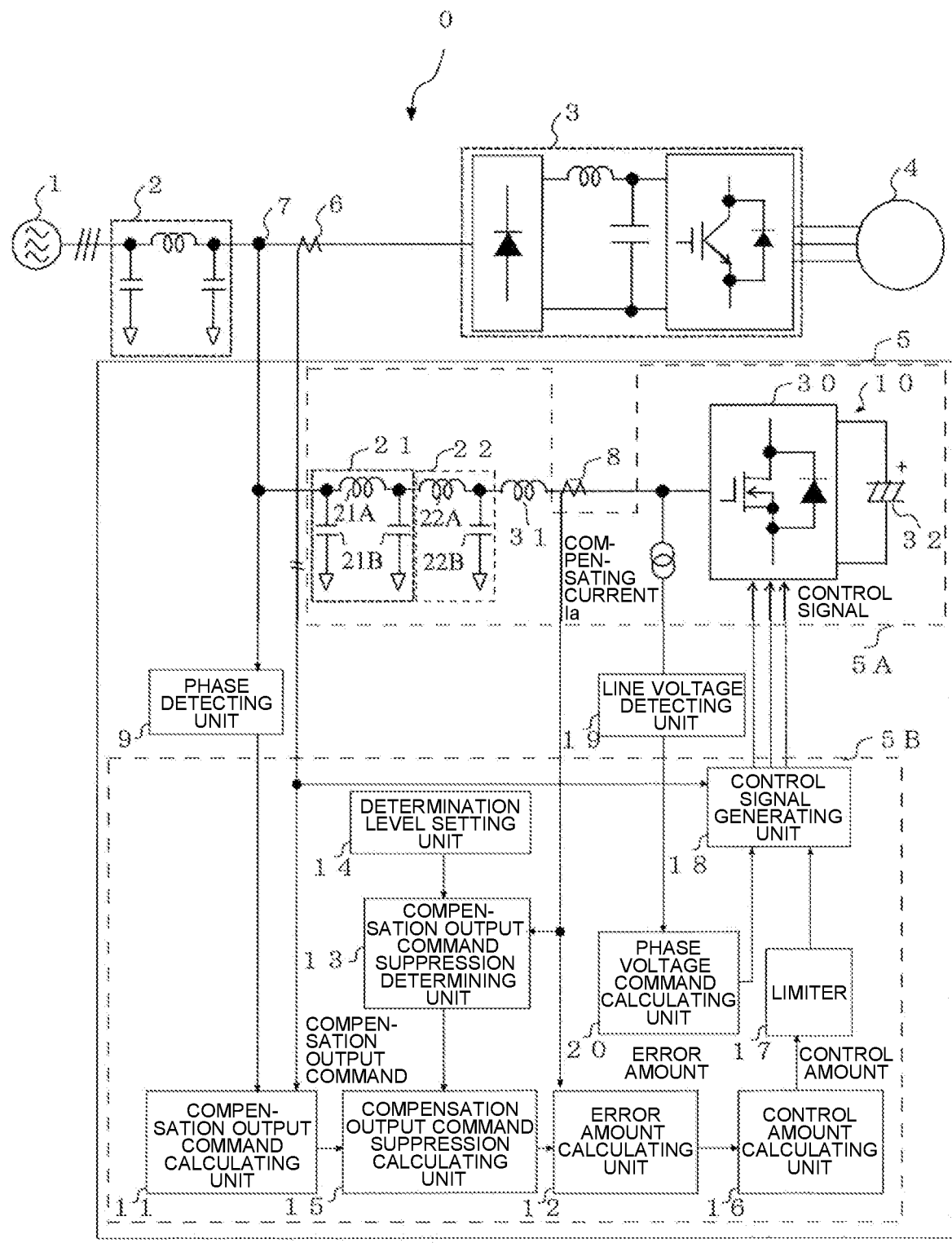
FIG. 1 is a diagram showing the configuration of an air-conditioning system 0 mainly including a harmonic current compensating device 5 in Embodiment 1 of the present disclosure.

Hereinafter, harmonic current compensating devices 5 and other devices according to embodiments of the present disclosure will be described with reference to the drawings. In the drawings, each of elements denoted by an identical reference character is an identical element or an element equivalent to the identical element. The same goes for the whole of embodiments described below. Level and others of voltage, velocity and the like are not particularly determined as relations with absolute values, and are relatively determined based on states, actions and others of devices and the like. In addition, the relation of sizes of constituents such as devices and elements in the drawings may differ from that of actual ones.

Embodiment 1

Configuration of Embodiment 1

FIG. 1 is a diagram showing the configuration of an air-conditioning system 0 mainly including a harmonic current compensating device 5 in Embodiment 1 of the present disclosure. As shown in FIG. 1, the air-conditioning system 0 includes a system power source 1, a bus side noise filter 2, a harmonic generating load 3, an air-conditioning device 4 and a harmonic current compensating device 5. For example, the system power source 1 is a commercial power source. Herein, a case where the system power source 1 is a three-phase alternating-current power source is described. However, the system power source 1 is not limited to the three-phase alternating-current power source. The bus side noise filter 2 is a filter to reduce noise generated between the system power source 1 and the harmonic generating load 3.

The harmonic generating load 3 is a load that is a harmonic generating source. The harmonic generating load 3 in Embodiment 1 is a power converting device including a rectifier, a direct-current reactor, a smoothing capacitor, and others. Particularly, the harmonic generating load 3 is an inverter device. The inverter device converts the alternating-current power of the system power source 1 into alternating-current power having an arbitrary frequency by a PWM control, and supplies the alternating-current power having an arbitrary frequency to the air-conditioning device 4. In Embodiment 1, as the smoothing capacitor of the harmonic generating load 3, a film capacitor is used instead of an electrolytic capacitor, in consideration of increase in the size of the device due to heat generation and life. Therefore, the harmonic generating load 3 in Embodiment 1 is an electrolytic capacitor-less inverter device. The air-conditioning device 4 as a substantial power load is a device that includes a refrigerant circuit and that performs air conditioning of a target space by circulating refrigerant.

The harmonic current compensating device 5 as an active filter is a device to suppress the harmonic generated by the harmonic generating load 3 by supplying compensating current Ia at a power receiving point 7 and compensating load current to be supplied to the harmonic generating load 3. As shown in FIG. 1, the harmonic current compensating device 5 in Embodiment 1 includes a circuit unit 5A and a control unit 5B. Further, a load current detector 6, a compensating current detector 8, a phase detecting unit 9 and a line voltage detecting unit 19 are devices for detection. The circuit unit 5A includes a power converter 10, a compensating device side noise filter 21 and a ripple filter 22. The circuit unit 5A will be described later. The control unit 5B includes a compensation output command calculating unit 11, an error amount calculating unit 12, a compensation output command suppression determining unit 13, a determination level setting unit 14, a compensation output command suppression calculating unit 15, a control amount calculating unit 16, a limiter 17, a control signal generating unit 18, and a phase voltage command calculating unit 20.

The load current detector 6 is provided between the system power source 1 and the harmonic generating load 3. The load current detector 6 detects the three-phase load current to be supplied to the harmonic generating load 3. Further, the load current detector 6 sends information about the detected load current, to the compensation output command calculating unit 11 and the control signal generating unit 18.

The compensating current detector 8 is provided on the output side of the power converter 10. The compensating current detector 8 detects the compensating current Ia output from the power converter 10. Further, the compensating current detector 8 sends a signal about the detected compensating current Ia, to the error amount calculating unit 12 and the compensation output command suppression determining unit 13.

The phase detecting unit 9 detects the phase θ of the power source voltage of the system power source 1. The phase detecting unit 9 in the embodiment includes a detecting circuit to detect a zero point of the power source voltage of the system power source 1. The phase detecting unit 9 evaluates, by calculation, the phase θ of the power source voltage, from the detected zero point of the power source voltage of the system power source 1.

The compensation output command calculating unit 11 removes a fundamental component from the load current detected by the load current detector 6, and extracts a harmonic component of the load current. At this time, the compensation output command calculating unit 11 evaluates the harmonic component of the load current detected by the load current detector 6, for each phase θ calculated by the phase detecting unit 9. Then, the compensation output command calculating unit 11 sends a signal corresponding to the evaluated harmonic component to the error amount calculating unit 12, as a compensation output command. In the embodiment, the compensation output command calculating unit 11 sends the signal to the error amount calculating unit 12 through the compensation output command suppression calculating unit 15. The compensation output command suppression calculating unit 15 suppresses the harmonic component in the compensation output command sent by the compensation output command calculating unit 11, based on a suppression instruction included in the signal from the compensation output command suppression determining unit 13, and then sends the signal to the error amount calculating unit 12.

The determination level setting unit 14 sets a suppression determination value to be used when the compensation output command suppression determining unit 13 performs determination about compensation output command suppression. The suppression determination value is a value set by an installation worker or other persons depending on the disproportion of the interphase voltage of the system power source 1, the magnitude of the voltage distortion and others. The determination level setting unit 14 sets a suppression determination value selected from a plurality of predetermined suppression determination values.

The compensation output command suppression determining unit 13 compares the compensating current Ia and the preset suppression determination value, and determines whether the compensation output command is to be suppressed. When the compensation output command suppression determining unit 13 determines that the compensation output command is to be suppressed, the compensation output command suppression determining unit 13 sends a signal for the suppression instruction to the compensation output command suppression calculating unit 15.

The error amount calculating unit 12 evaluates the error amount between the compensation output command and the compensating current Ia, based on the compensation output command supplied from the compensation output command calculating unit 11 and the compensating current Ia detected by the compensating current detector 8. Then, the error amount calculating unit 12 sends a signal about the evaluated error amount, to the control amount calculating unit 16.

The control amount calculating unit 16 evaluates the control amount of the power converter 10 based on information about the error amount included in the signal sent from the error amount calculating unit 12. Then, the control amount calculating unit 16 sends a signal about the evaluated control amount, to the limiter 17. The control amount calculating unit 16 controls the load current for each phase θ in a control cycle.

The line voltage detecting unit 19 is provided on the output side of the power converter 10. The line voltage detecting unit 19 detects the power source voltage of the system power source 1 supplied to the power converter 10 and a change in the voltage. Then, the line voltage detecting unit 19 sends a signal about the detected power source voltage, to the phase voltage command calculating unit 20.

The phase voltage command calculating unit 20 calculates an effective phase voltage for each cycle of the system power source 1, based on instantaneous line voltage detected in the control cycle. Further, the phase voltage command calculating unit 20 calculates an instantaneous phase voltage based on the calculated effective phase voltage and the phase θ of the power source voltage detected by the phase detecting unit 9. Then, the phase voltage command calculating unit 20 sends a signal about the calculated instantaneous phase voltage, to the control signal generating unit 18.

The limiter 17 performs suppression, such that the control amount included in the signal from the control amount calculating unit 16 does not exceed an overcurrent level of the compensating current Ia. The limiter 17 supplies a suppression result to the control signal generating unit 18. The overcurrent level is set to the upper limit of the absolute value of the amplitude of the compensating current Ia, to avoid electric circuit breakage such as dielectric breakdown. Accordingly, when the control amount included in the signal from the control amount calculating unit 16 exceeds the overcurrent level of the compensating current Ia, the limiter 17 sends a signal about the control amount adjusted to the upper limit of the absolute value of the amplitude of the compensating current Ia, to the control signal generating unit 18.

Figure 2:
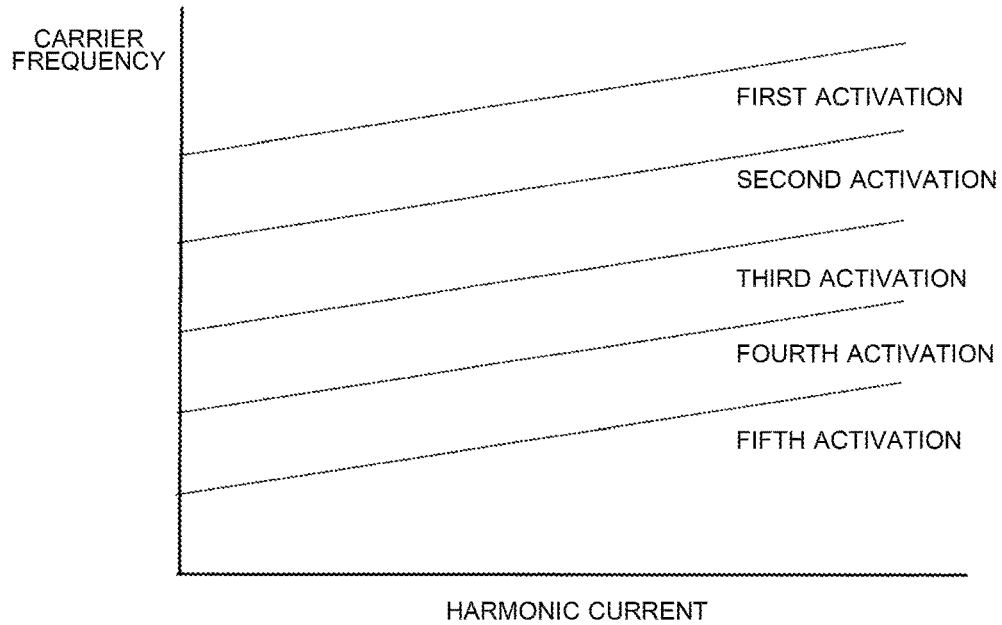
FIG. 2 is a diagram for describing a calculation in a control signal generating unit 18 according to Embodiment 1 of the present disclosure.

FIG. 2 is a diagram for describing a calculation in the control signal generating unit 18 according to Embodiment 1 of the present disclosure. The control signal generating unit 18 generates a control signal based on the signal about the control amount sent from the limiter 17 and a carrier frequency, and sends the control signal to the power converter 10. Further, the control signal generating unit 18 determines a switching frequency at which the control signal is generated, based on the three-phase load current detected by the load current detector 6 and input to the harmonic generating load 3, as shown in FIG. 2. For example, when some kind of abnormality is detected, the control signal generating unit 18 stops the generation of the control signal to avoid electric circuit breakage such as dielectric breakdown in the harmonic current compensating device 5. When the control signal generating unit 18 is activated again, it is possible to alter the value of the switching frequency based on the load current. As a decision method for the switching frequency, the input power of the harmonic generating load 3 may be calculated from the instantaneous phase voltage supplied from the phase voltage command calculating unit 20 and the load current detected by the load current detector 6, and the switching frequency may be decided from the input power.

Figure 3:
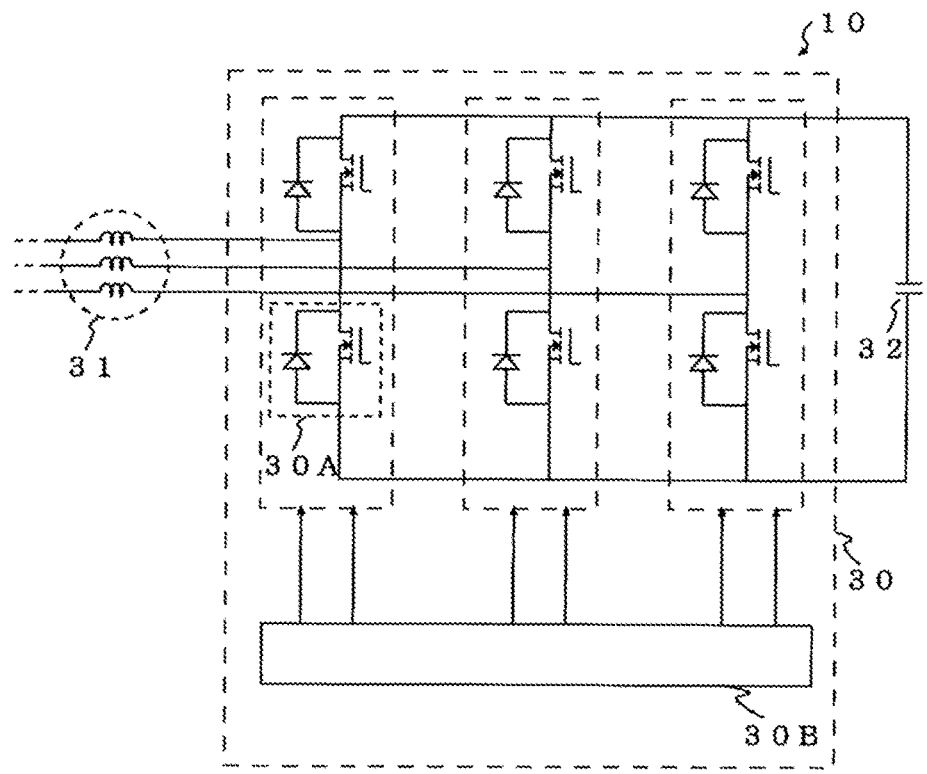
FIG. 3 is a diagram showing an exemplary configuration of a power converter 10 in the harmonic current compensating device 5 according to Embodiment 1 of the present disclosure.

FIG. 3 is a diagram showing an exemplary configuration of the power converter 10 in the harmonic current compensating device 5 according to Embodiment 1 of the present disclosure. Next, the circuit unit 5A of the harmonic current compensating device 5 will be described. The power converter 10 in Embodiment 1 is a device having a function as a forward converter and a function as a reverse converter. The power converter 10 supplies, to the power receiving point 7, power to generate the compensating current Ia based on the control signal sent from the control signal generating unit 18. The power converter 10 suppresses the harmonic component of the load current, such that the current containing the harmonic component does not flow into the system power source 1. As shown in FIG. 1, the power converter 10 includes a bridge circuit 30, a reactor unit 31 and an accumulation capacitor 32.

The bridge circuit 30 includes three pairs of arms 30A. In each pair, arms 30A each of which is constituted by a switching element 23 and a freewheeling diode 24 described later are disposed in a top-bottom direction. Further, the bridge circuit 30 includes a gate driving circuit 30B that causes the switching element 23 to perform switching operation. The reactor unit 31 includes reactors connected to middle points of the three pairs of arms 30A respectively. The accumulation capacitor 32 is provided at a direct-current part of the bridge circuit 30, and accumulates energy.

Figure 4:
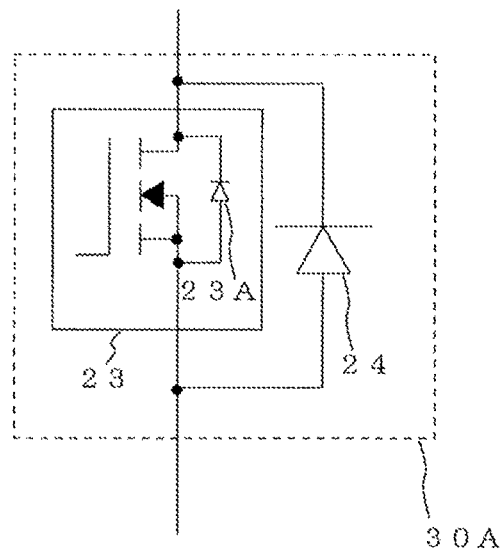
FIG. 4 is a diagram showing the configuration of an arm 30A in the harmonic current compensating device 5 according to Embodiment 1 of the present disclosure.

FIG. 4 is a diagram showing the configuration of the arm 30A of the harmonic current compensating device 5 according to Embodiment 1 of the present disclosure. In Embodiment 1, each switching element 23 of the power converter 10 is a unipolar device including a field effect transistor using a wide bandgap semiconductor. As the switching element 23, for example, a SiC (silicon carbide)-MOSFET is used. As the material of the wide bandgap semiconductor, a gallium nitride material or diamond may be used. The wide bandgap semiconductor allows a drive based on a high carrier frequency. Further, the wide bandgap semiconductor has high voltage endurance, permissible current and heat tolerance, and allows the downsizing of the power converter 10. Further, the unipolar device includes a parasitic diode 23A with forward voltage in the interior. The parasitic diode 23A is a freewheeling element to release the current.

In Embodiment 1, separately from the parasitic diode 23A, the arm 30A includes a freewheeling diode 24 having a lower forward voltage than the parasitic diode 23A, as a freewheeling element. The freewheeling diode 24 is connected to the switching element 23 in parallel. As the freewheeling diode 24, for example, a Schottky barrier diode, a fast recovery diode, or other diodes is used. For the freewheeling diode 24, a wide bandgap semiconductor may be used.

In Embodiment 1, the switching element 23 is a unipolar device using the wide bandgap semiconductor. Therefore, it is possible to drive the power converter 10 at a switching frequency higher than switching frequencies of other power converters in the system. Accordingly, it is possible to perform the compensation even when a higher harmonic than before is generated, for example, the harmonic generating load 3 includes no electrolytic capacitor. Further, the withstanding pressure of the switching element 23 is higher than before. Therefore, it is possible to set the direct-current voltage in the compensation control by the harmonic current compensating device 5 to a higher voltage than before, and to shorten the interval of the compensation control.

As shown in FIG. 1, the circuit unit 5A of the harmonic current compensating device 5 includes the compensating device side noise filter 21 and the ripple filter 22. The compensating device side noise filter 21 is a filter to reduce noise generated by the drive of the power converter 10. As described above, the switching frequency in the switching element 23 of the power converter 10 increases, so that the noise is generated. Therefore, in Embodiment 1, the harmonic current compensating device 5 includes the compensating device side noise filter 21. The compensating device side noise filter 21 includes a noise suppression reactor 21A and a noise suppression capacitor 21B.

The ripple filter 22 is a filter to suppress ripple due to the conversion by the power converter 10. The ripple filter 22 includes a ripple suppression reactor 22A and a ripple suppression capacitor 22B. The ripple filter 22 is provided upstream of the compensating device side noise filter 21 in the flow of the compensating current Ia from the power converter 10. The compensating device side noise filter 21 and the ripple filter 22 include the reactors and the capacitors. Therefore, there is a problem of resonance current. Hence, to prevent resonance, the noise suppression capacitor 21B has a sufficient smaller capacity than the ripple suppression capacitor 22B. Alternatively, the ripple suppression reactor 22A may have a sufficiently smaller capacity than the noise suppression reactor 21A. Both conditions may be satisfied. Herein, the sufficiently smaller capacity means that the capacity of the smaller one is about 1/100 of the capacity of the larger one.

Effects of Embodiment 1

In the harmonic current compensating device 5 of the air-conditioning system 0 in Embodiment 1 described above, the unipolar device using the wide bandgap semiconductor is used as the switching element 23 of the power converter 10. Therefore, it is possible to increase the carrier frequency, and to drive the switching element 23 at the highest switching frequency in the air-conditioning system 0. Accordingly, it is possible to set the direct-current voltage in the compensation control by the harmonic current compensating device 5 to a higher voltage than before, and to shorten the interval of the compensation control. Thereby, it is possible to enhance the transient response performance of the current control. Further, it is possible to suppress the harmonic component to flow from the harmonic generating load 3 into the system power source 1 due to a frequency change, a load change or a switching, for example. Further, it is possible to suppress the amount of the harmonic component to equal to or less than a standard value in a harmonic guideline. Therefore, it is possible to suppress the harmonic component even when the harmonic generating load 3 is an electrolytic capacitor-less device. Further, since the wide bandgap semiconductor is used for the switching element 23, it is possible to increase the withstanding pressure.

Further, in the harmonic current compensating device 5 in Embodiment 1, as for a harmonic current compensating range, it is possible to suppress the harmonic current component in an order higher than orders handled by conventional harmonic current compensating devices. Moreover, it is possible to reduce conduction loss in the switching element 23. Furthermore, by the increase in the switching frequency, it is possible to downsize passive parts such as filters of the harmonic current compensating device 5.

Further, the harmonic current compensating device 5 in Embodiment 1 includes the compensating device side noise filter 21. Therefore, it is possible to suppress switching noise generated due to the increase in the switching frequency at the time of the drive of the switching element 23 of the power converter 10. At this time, the compensating device side noise filter 21 is a filter capable of reducing noise in a higher frequency band than the bus side noise filter 2. Further, even when the resonance can occur because of the configuration, it is possible to suppress the occurrence of the resonance by changing the switching frequency corresponding to the load current. Further, it is possible to suppress the generation of the harmonic component of the load current by avoiding the resonance by changing the switching frequency corresponding to the load current. Therefore, it is possible to continue the operation of the air-conditioning system 0 without an abnormal stop of the system equipment. Accordingly, in Embodiment 1, it is possible to maintain the performance of the air-conditioning device 4.

Embodiment 2

In Embodiment 1 described above, the harmonic current compensating device 5 is a current compensation type device to compensate the harmonic current caused by the harmonic generating load 3, but the harmonic current compensating device 5 is not limited to this type. The harmonic current compensating device 5 may be a voltage compensation type device to compensate harmonic voltage caused by the harmonic generating load 3. Further, the system power source 1 is a three-phase alternating-current power source, but a single-phase alternating-current power source can be also adopted.

Embodiment 3

Figure 5:
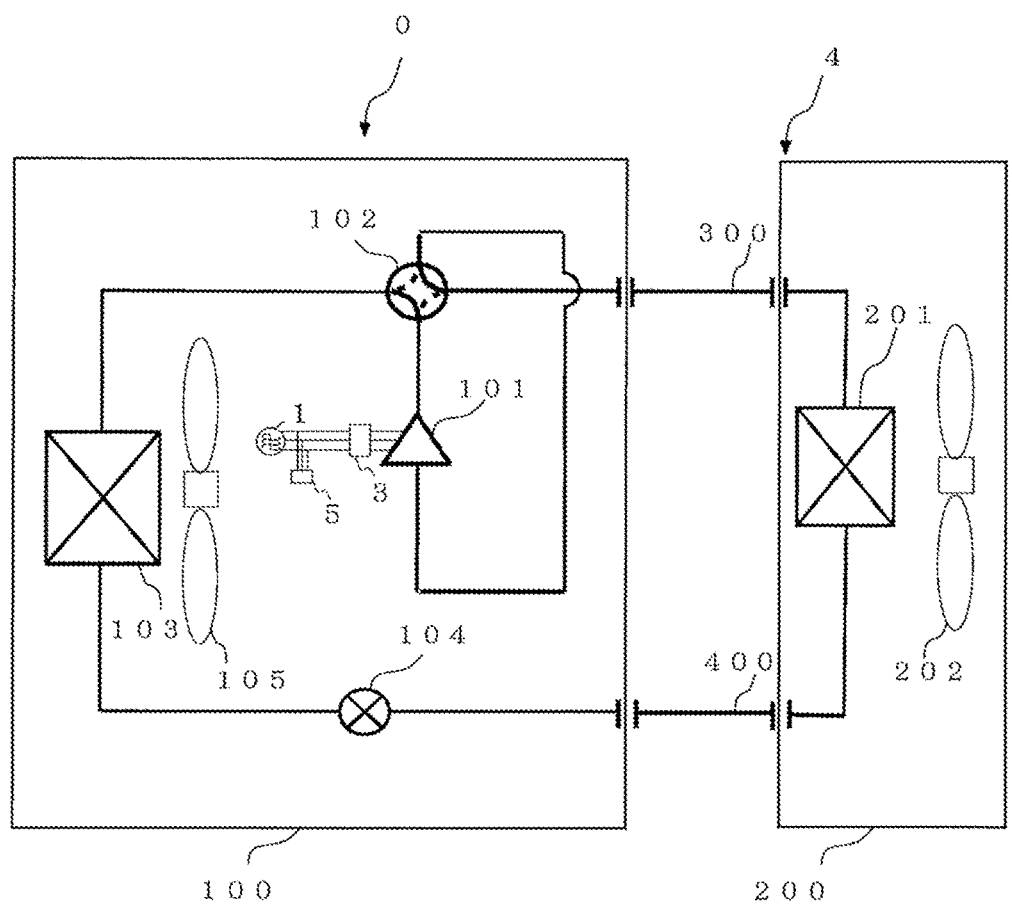
FIG. 5 is a configuration diagram of an air-conditioning system 0 mainly including an air-conditioning device 4 according to Embodiment 3 of the present disclosure.

FIG. 5 is a configuration diagram of an air-conditioning system 0 mainly including an air-conditioning device 4 according to Embodiment 3 of the present disclosure. In Embodiment 3, the air-conditioning system 0 will be described with focus on the air-conditioning device 4. The configuration of the air-conditioning device 4 in Embodiment 3 is an example, and is not limitative.

In the air-conditioning device 4 in FIG. 5, an outdoor unit 100 and an indoor unit 200 are connected by a gas refrigerant pipe 300 and a liquid refrigerant pipe 400, so that a refrigerant circuit to circulate refrigerant is made. The outdoor unit 100 includes a compressor 101, a four-way valve 102, an outdoor heat exchanger 103, an expansion valve 104 and an outdoor fan 105. Further, the indoor unit 200 includes an indoor heat exchanger 201.

The compressor 101 compresses and discharges the suctioned refrigerant. The compressor 101 includes an electrolyte capacitor-less inverter device that is the harmonic generating load 3 described in Embodiment 1. Therefore, the compressor 101 can arbitrarily change the driving frequency, and can minutely change the capacity (the amount of the refrigerant to be fed per unit time) of the compressor 101. The harmonic current compensating device 5 described in Embodiment 1 or Embodiment 2 is attached between the system power source 1 to supply power for the drive of the compressor 101 and the harmonic generating load 3. The four-way valve 102 is a valve to switch the flow of the refrigerant between a cooling operation and a heating operation.

The outdoor heat exchanger 103 exchanges heat between the refrigerant and air (outdoor air). During the heating operation, the outdoor heat exchanger 103 functions as an evaporator, and evaporates the refrigerant to gasify the refrigerant. During the cooling operation, the outdoor heat exchanger 103 functions as a condenser, and condenses the refrigerant to liquefy the refrigerant. The outdoor fan 105 sends the outdoor air to the outdoor heat exchanger 103, to facilitate the heat exchange between the outdoor air and the refrigerant.

The expansion valve 104 such as an expansion device (flow control device) that is a decompressor decompresses and expands the refrigerant. For example, when the expansion valve 104 is an electronic expansion valve or other valves, the expansion valve 104 adjusts the opening degree based on an instruction from a controller (not illustrated) or other devices. The indoor heat exchanger 201 exchanges heat between air as an air-conditioning target and the refrigerant. During the heating operation, the indoor heat exchanger 201 functions as a condenser, and condenses the refrigerant to liquefy the refrigerant. During the cooling operation, the indoor heat exchanger 201 functions as an evaporator, and evaporates the refrigerant to gasify the refrigerant. An indoor fan 202 sends the air as the air-conditioning target to the indoor heat exchanger 201, to facilitate the heat exchange between the air and the refrigerant.

As described above, according to the air-conditioning system 0 in Embodiment 3, by adopting a configuration of including the harmonic current compensating device 5 described in Embodiment 1 and Embodiment 2, it is possible to configure the harmonic generating load 3 with an electrolytic capacitor-less inverter device. Therefore, it is possible to suppress heat generation and other adverse effects, to increase the life, and to continuously obtain the air-conditioning performance.

REFERENCE SIGNS LIST 0 air-conditioning system 1 system power source 2 bus side noise filter 3 harmonic generating load 4 air-conditioning device 5 harmonic current compensating device 5A circuit unit 5B control unit 6 load current detector 7 power receiving point 8 compensating current detector 9 phase detecting unit 10 power converter 11 compensation output command calculating unit 12 error amount calculating unit 13 compensation output command suppression determining unit 14 determination level setting unit 15 compensation output command suppression calculating unit 16 control amount calculating unit 17 limiter 18 control signal generating unit 19 line voltage detecting unit 20 phase voltage command calculating unit 21 compensating device side noise filter 21A noise suppression reactor 21B noise suppression capacitor 22 ripple filter 22A ripple suppression reactor 22B ripple suppression capacitor 23 switching element 23A parasitic diode 24 freewheeling diode 30 bridge circuit 30A arm 30B gate driving circuit 31 reactor unit 32 accumulation capacitor 100 outdoor unit 101 compressor 102 four-way valve 103 outdoor heat exchanger 104 expansion valve 105 outdoor fan 200 indoor unit 201 indoor heat exchanger 202 indoor fan 300 gas refrigerant pipe 400 liquid refrigerant pipe

The invention claimed is:

1. A harmonic current compensating device comprising a power converter including at least a pair of arms each including a switching element, the harmonic current compensating device being configured to drive the switching element and supply compensating current to load current flowing between a system power source and a harmonic generating load, wherein
the harmonic current compensating device comprises
a compensating device side noise filter including a noise suppression capacitor and a noise suppression reactor, the compensating device side noise filter being configured to suppress noise of the compensating current, the noise of the compensating current being generated by the drive of the switching element, and
a ripple filter including a ripple suppression capacitor and a ripple suppression reactor, wherein
the ripple filter is configured to suppress ripple of the compensating current,
the switching element is configured to operate at a frequency higher than a switching frequency of the harmonic generating load, and
the noise suppression capacitor has a smaller capacity than the ripple suppression capacitor.

2. The harmonic current compensating device of claim 1, wherein the compensating device side noise filter has a higher frequency band than a bus side noise filter, and the bus side noise filter is configured to suppress noise of the load current flowing between the system power source and the harmonic generating load.

3. The harmonic current compensating device of claim 1, wherein the ripple suppression reactor has a smaller capacity than the noise suppression reactor.

4. The harmonic current compensating device of claim 1, comprising a control unit configured to control the drive of the switching element at a driving frequency higher than a driving frequency of a switching element of the harmonic generating load.

5. The harmonic current compensating device of claim 1, wherein the power converter includes a freewheeling diode connected to the switching element in parallel.

6. The harmonic current compensating device of claim 5, wherein the freewheeling diode has a forward voltage lower than a forward voltage of a parasitic diode of the switching element.

7. The harmonic current compensating device of claim 1, further comprising:
a load current detector configured to detect the load current to the harmonic generating load;
a compensation output command calculating unit configured to calculate a value of a compensation output command to compensate a harmonic component of the load current;
a compensating current detector configured to detect the compensating current;

an error amount calculating unit configured to send a signal about an error amount between the value of the compensation output command and the compensating current, based on the value of the compensation output command and the compensating current;

a control amount calculating unit configured to evaluate a control amount of the power converter based on the error amount;

a line voltage detecting unit configured to detect a power source voltage of the system power source and a change in the power source voltage; and a phase voltage command calculating unit configured to calculate an effective phase voltage of the system power source.

8. The harmonic current compensating device of claim 1, wherein the harmonic generating load is an electrolytic capacitor-less device that does not include an electrolytic capacitor.

9. An air-conditioning system including the harmonic current compensating device of claim 1, wherein the harmonic current compensating device is disposed between a power converting device and the system power source, and the power converting device is configured to control a driving frequency of a compressor to compress refrigerant.

10. The harmonic current compensating device of claim 1, further comprising a unipolar device in which a wide bandgap semiconductor element is used as the switching element.

11. A harmonic current compensating device comprising a power converter including at least a pair of arms, wherein each arm includes a switching element, the harmonic current compensating device is configured to drive the switching element and supply compensating current to load current flowing between a system power source and a harmonic generating load, the harmonic current compensating device comprises a ripple filter including a ripple suppression capacitor and a ripple suppression reactor, the ripple filter being configured to suppress ripple of the compensating current, and a compensating device side noise filter including a noise suppression capacitor and a noise suppression reactor, wherein the compensating device side noise filter is configured to suppress noise of the compensating current, the noise of the compensating current is generated by the drive of the switching element, and the ripple suppression reactor has a smaller capacity than the noise suppression reactor.

12. The harmonic current compensating device of claim 11, further comprising a unipolar device in which a wide bandgap semiconductor element is used as the switching element.

13. The harmonic current compensating device of claim 11, wherein the compensating device side noise filter is configured to suppress noise of the load current flowing between the system power source and the harmonic generating load.

* * * * *